United States Patent Office 3,767,631
Patented Oct. 23, 1973

3,767,631
PROCESS FOR THE PRODUCTION OF ACRYLO-
NITRILE COPOLYMERS CONTAINING TER-
TIARY ALIPHATIC OR CYCLOALIPHATIC
AMINO FUNCTIONS
Helmut Engelhard, Leverkusen, and Heinrich-August
Rinkler and Günther Nischk, Dormagen, Germany, assignors to Bayer Aktiengesellschaft, Leverkusen, Germany
No Drawing. Filed Sept. 17, 1971, Ser. No. 181,585
Claims priority, application Germany, Sept. 18, 1970,
P 20 46 086.0
Int. Cl. C08f 1/62
U.S. Cl. 260—80.73    10 Claims

ABSTRACT OF THE DISCLOSURE

The present invention relates to a process for the production of copolymers of at least 60% by weight of acrylonitrile, 0.5 to 20% by weight of a polymerisable compound containing an aliphatic or cycloaliphatic tertiary amine function, and optionally up to 20% by weight of another polymerisable compound from the group of vinyl, vinylidene and methacryloyl derivatives, by copolymerisation in acid aqueous medium with redox catalyst systems, which consists of a peroxidic compound and a mercapto compound, in particular hydrogen peroxide and thioglycol.

---

This invention relates to a process for the production of acrylonitrile copolymers containing aliphatic or cycloaliphatic tertiary amino groups, which are distinguished by their outstanding natural colour, by their thermal stability, and by their high affinity for acidic dyes and metal complex dyes, and which can be spun into fibres.

It is known that the affinity for the aforementioned dyes of polyacrylonitrile fibres or films can be improved by copolymerising acrylonitrile with monomers containing tertiary amino functions, for example, N-(3-dimethylaminopropyl)-(meth)acrylamide, β - diethylaminoethyl vinyl ethers or dialkylaminoalkyl-(meth)acrylates (Houben-Weyl, Methoden der organischen Chemie, vol. 14/1, pages 998, et seq., 1961).

For homopolymerising and copolymerising the dialkylaminoalkyl-(meth)acrylates with acrylonitrile, peroxides are used in an acetic acid or hydrochloric acid medium according inter alia to United States patent specification No. 2,138,762; azo compounds, such as 2,2'-diguanyl-2,2'-azopropane hydrochloride, for example in sulphuric acid medium are used according to United States patent specification 2,599,300; and azoisobutyronitrile in ethanol (Vysokomol Soldin., Ser. B. 1968, 10 (6), 422–5; C.A. 69,52489k) either individually or in conjunction with thiourea derivatives, 50% by weight sodium thiocyanate solution being used as the solvent (British patent specification No. 865,814).

In every instance, however, the conversions obtained are too low, or the chain length of the polymers too short. In addition, the solvents are unsuitable, either for technical or for economic reasons.

In order to obviate these disadvantages and to take advantage of aqueous precipitation polymerisation, it is possible, in accordance with German patent specification No. 917,812, to carry out a copolymerisation of acrylonitrile with dialkylaminoalkyl acrylates or N-dialkylaminoalkyl acrylamides quaternised by alkylating agents, for example, dimethyl sulphate, methyl bromide or chloroacetic acid esters, initiated by redox systems such as potassium persulphate, with sodium hyposulphite or sodium dithionate. Quaternary amine structures in an acrylonitrile polymer, however, frequently promote deterioration of the thermal stability of the polymer or of the fibres dry-spun from them, in addition to which the use of alkylating agents involves additional technical and economic outlay.

According to United States patent specification No. 2,649,438, N-substituted (meth)acrylamides containing tertiary amino groups, such as N-β-dimethyl aminoethyl acrylamide, can be copolymerised in sulphuric acid solution with acrylonitrile by potassium persulphate/sodium hydrogen sulphite. Although fibres wet-spun from the copolymers show an affinity for acidic dyes, it is impossible to determine the extent to which the basic comonomer is introduced during copolymerisation.

When a β-dialkylaminoethyl methacrylate is used as comonomer, it has been found that, though there is evidence of some incorporation during copolymerisation with acrylonitrile and methyl acrylate in sulphuric acid medium using potassium persulphate/sodium metabisulphite as redox system, it is not possible simultaneously to obtain a high polymer conversion, an adequate average molecular weight, and satisfactory incorporation of the basic monomer. It is clear from this that the copolymerisation of acrylonitrile is influenced to a considerable extent by the presence of the basic monomer, and that for example, the reaction medium and/or initiator, must satisfy special requirements to ensure satisfactory incorporation of the monomers containing aliphatic tertiary amino groups. If, for example, aqueous sulphuric acid, is replaced by aqueous nitric acid as the reaction medium, the polymer yield, incorporation ratio of the basic monomer in the copolymer, average molecular weight, and affinity for dyes are considerably improved (cf. comparison tests). On the other hand, the thermal stability of dry-spun fibres obtained from copolymers of acrylonitrile, methyl acrylate and β-dimethyl-aminoethyl methacrylate, such as these obtained in nitric acid solution, is not altogether satisfactory.

The large number of already known redox systems also includes those consisting of peroxidic compounds as oxidising agents and of mercaptans as reducing agents (Houben-Weyl, Methoden der organischen Chemie, vol. 14/1, pages 264 et seq., 1961). It has now surprisingly been found that extremely good results in regard to the properties of the polymer and of the fibres spun therefrom can be obtained, in particular, by initiating polymerisation of an acrylonitrile methyl acrylate β-dialkylaminoethyl methacrylate mixture with redox systems of this kind. This combination of initiators and monomers was hitherto unknown.

Accordingly, the present invention relates to a process for the production of acrylonitrile copolymers which comprises polymerising at least 60% by weight of acrylonitrile, from 0.5 to 20% by weight of a polymerisable compound containing an aliphatic or cycloaliphatic tertiary amine function and 0 to 20% by weight of an additional polymerisable monomer selected from the group consisting of a vinyl, vinylidene, acrylic and methacrylic monomer in an aqueous acidic medium, at a temperature of from 20 to 90° C. and in the presence of a redox catalyst system consisting of a peroxidic compound of the general formula

in which R and R' each represent a member selected from the group consisting of hydrogen, an alkali metal ion and an alkaline earth metal ion, or one of the radicals represents hydrogen and the other represents a member selected from the group consisting of an alkacyl, aracyl, alkaracyl, and an aralkacyl radical, and of a mercapto compound corresponding to the general formula

in which R" represents a member selected from the group consisting of an alkyl, monohydroxyalkyl, polyhydroxyalkyl and a monocarbonyl alkyl radical.

The polymers with an adequate average molecular weight, obtained in high yields by the process according to the invention, and the fibres dry-spun from them are distinguished by a favourable natural colour, by outstanding thermal stability, and by excellent dyeing properties. The fastness to light and washing of the dye finishes obtained with acidic and complex dyes is as superior to that of alkyl vinyl pyridine-modified, dry-spun modacrylic fibres as the resist is with respect to basic dyes.

Suitable polymerisable compounds containing an aliphatic or cycloaliphatic tertiary amino function include compounds which, in addition to a C=C group, contain an aliphatic or cycloaliphatic tertiary amino function, for example N-dialkylaminoalkyl (meth)acrylamides or itaconic acid amides; dialkylaminoalkyl (meth)acrylates, maleates or fumarates; dialkylaminoalkyl vinyl ethers, and N-allyl, C-allyl or C-vinylamines.

It is advisable to carry out copolymerisation of the basic monomer with acrylonitrile in the presence of other copolymerisable compounds for example, (meth)acrylic esters, hydroxyalkyl (meth)acrylic esters, (meth) acrylic amides, vinyl acetate, 1,3-diacetoxy-2-methylene propane, styrene and its substitution products etc., because it is possible, by including them in the polymer, favourably to influence both the physical properties and the dyeing properties of the copolymers and of the fibres produced from them.

For copolymerisation, the acrylonitrile is used in a quantity of from 60 to 99.5% by weight, the tertiary amino comonomer in a quantity of from 0.5 to 20% by weight, and the other polymerisable compound in a quantity of up to 20% by weight, based on the total quantity of monomers. For precipitation polymerisation, the reaction is carried out in a weakly acid or neutral range, at a pH value of from 2 to 7.5 which is adjusted by forming the acid salt of the corresponding tertiary amino monomer in water. It is of advantage to maintain a pH value of from 5.5 to 7, especially when hydrolysable monomers containing tertiary amino functions, for example w-dialkylaminoalkyl(meth)acrylates, are used, because in cases such as these the monomer is completely incorporated into the polymer. At the same time, an oxygen-free atmosphere is maintained in the reaction vessel by blowing purified nitrogen into the solution. The polymerisation temperature is in the range from 20 to 90° C., preferably in the range from 50 to 60° C., the quantity in which the water is used being from 5 to 15 times greater than the monomer total. In the redox system used, the oxidising agent is employed in a quantity of from 0.01 to 5% by weight, whilst the reducing agent is employed in a quantity of from 0.1 to 5% by weight, based on the monomers. It is also advisable to add from 0.0005 to 0.001% by weight of 2- or 3-valent iron ions in the form of a salt, for example, $FeCl_2$ or $FeSO_4$. in order to guarantee uniform completion of the reaction.

After working up, the copolymers obtained in this way have K-values (according to Fikentscher Cellulosechemie 13, 58 (1932)) of from 70 to 120 which are adequate for commercial application. They are soluble in dimethyl formamide, show an affinity for acidic dyes and can be spun into filaments by the usual methods.

The basic monomer content of the copolymers is determined analytically by determining the basic nitrogen content, for which purpose the copolymers are dissolved in a formic acid/nitromethane mixture and thereafter titrated with perchloric acid. The basic nitrogen content of the mixture of starting monomers, which counts as the reference value, can be similarly determined.

To determine the affinity of the polymers for dyes, a thin film (250 to 500μ) is cast on to a glass plate from an approximately 15 to 20% by weight dimethyl formamide solution. This film is dried for a few hours at 60 to 70° C., removed from the glass plate and then boiled for 1 hour in water in order to remove any dimethyl formamide trapped in it. Thereafter, the film is boiled for 1.5 hours with 100 parts by volume of a dye solution [1 part by weight of Azilandirektblau A (Colour Index, vol. I, page 1264) and 8 parts by volume of 10% by weight sulphuric acid dissolved in 1000 parts by volume of water] and finally is boiled for about another 15 minutes with distilled water. The dried, coloured film is dissolved in 100 parts by volume of dimethyl formamide and the extinction of the resulting solution is measured at 20° C. and at the wave length indicated. The result is expressed as extinction per g. of film.

A measure of the natural colour and thermal stability of the fibres is the extinction (at 420 mμ) of a 5% by weight solution in dimethyl formamide at room temperature and after heating for 1 hour.

In order to measure the conductivity of the polymer solution, 400 mg. of polymer are made into a paste with 4 ml. of methanol (natural conductivity less than 0.2 μS) and dissolved in 40 ml. of dimethyl formamide (DMF) (natural conductivity less than 0.2 μS). Measurement of conductivity at 20° C. is followed by the addition of twice the amount that can be lifted on a spatula of an ion exchanger having a cation exchange capacity of approximately 2.3 m. equ./g. and an anion exchange capacity of approximately 1.5 m. equ./g. (ion exchanger V manufactured by Messrs. Merck (Mixed bed exchanger), which had been dried in air for 15 to 30 minutes following removal from the supply bottle. After stirring for 20 to 30 minutes, conductivity is remeasured at 20° C.

To determine the tack point (° C.) of the fibres, a bundle of fibres is immersed for 3 seconds in a heated glycerin bath and then chilled with cold water. The temperature at which the cooled fibres bond together is the tack point.

In the comparison tests and in the examples, parts by weight are to parts by volume as kg. to litres.

COMPARISON TESTS (a) Comparison of the copolymerisation of acrylonitrile (AN), methyl acrylate (AME), and β-dimethylaminoethyl methacrylate (DMAM) in sulphuric acid and nitric acid solution.

70 parts by weight of a monomer mixture consisting of 87% by weight of AN, 8% by weight of DMAM and 5% by weight of AME, are taken up in 900 parts by volume of water, acidified to the pH value indicated in the table with the volume indicated of 65% by weight acid and polymerised for 5 hours at 50 to 55° C. with the quantity of initiator indicated.

| Addition/parts volume | pH-value | Initiator/parts by weights | Yield percent of theoretical | K-value | Dyeability 578 mµ extinction/g. of film |
|---|---|---|---|---|---|
| I ..... 30/65% $HNO_3$ | 0.85 | 0.7/$K_2S_2O_8$ 0.7/$Na_2S_2O_5$ | 75 | 103 | 35 |
| II .... 30/65% $H_2SO_4$ | 0.9 | 0.7/$H_2S_2O_8$ 0.7/$Na_2S_2O_5$ | 50 | 145 | 29 |
| III ... 15/65% $HNO_3$ | 1.05 | 0.5/$K_2S_2O_8$ 0.8/$Na_2S_2O_5$ | 80 | 97 | 33.4 |
| IV .... 15/65% $H_2SO_4$ | 1.1 | 0.5/$K_2S_2O_8$ 0.8/$Na_2S_2O_5$ | 35 | 139 | 26 |

(b) Comparison of the copolymerisation of AN, with β-diisopropylaminoethyl methacrylate (DIAM) in sulphuric acid and nitric acid solution.

70 parts by weight of monomer mixture consisting of 93% by weight of AN and 7% by weight of DIAM are polymerised for 6 hours in 930 parts by volume of water at a temperature of 55° C., and at a pH value of 2.8 adjusted by the corresponding acid.

| Addition | Initiator/parts by weight | Yield. percent | K-value | Tert.N equ./kg. |
|---|---|---|---|---|
| I ............ $HNO_3$ ..... | 0.4/$K_2S_2O_8$ 0.2/$Na_2S_2O_5$ | 60 | 78 | 0.42 |
| II ........... $H_2SO_4$ .... | 0.4/$K_2S_2O_8$ 0.2/$Na_2S_2O_5$ | 20 | 68 | 0.20 |

(c) Comparison of the copolymerisation of AN, β-N-methyl-N-isopropyl aminoethyl methacrylate in sulphuric acid and nitric acid solution. Carried out as in (b):

| Addition | Initiator/parts by weight | Yield. percent | K-value | Tert.N equ./kg. |
|---|---|---|---|---|
| I ............ $HNO_3$ ..... | 0.4/$K_2S_2O_8$ 0.2/$Na_2S_2O_5$ | 62 | 80 | 0.47 |
| II ........... $H_2SO_4$ .... | 0.4/$K_2S_2O_8$ 0.2/$Na_2S_2O_5$ | 33 | 77 | 0.24 |

The following examples are to further illustrate the invention without limiting it.

EXAMPLE 1

Copolymerisation of AN, AME and DMAM in sulphuric acid solution with $H_2O_2$/thioglycol.

852 parts by weight of AN, 49 parts by weight of AME, and 78 parts by weight of DMAM are introduced into 7000 parts by volume of distilled water, and the pH value is adjusted to 3.8 with dilute sulphuric acid at 55° C. A gentle stream of nitrogen is bubbled through the solution. Polymerisation is initiated, while stirring, with 10 parts by volume of 30% by weight hydrogen peroxide, 2 parts by volume of thioglycol and 1 part by volume of a 0.01% by weight ferrous sulphate solution. The reaction begins after about 20 minutes. 1.5 hours after the first addition of initiator, 5 parts by volume of 30% by weight hydrogen peroxide and 1 part by volume of thioglycol are added at 55° C. This addition is repeated after another 1.5 hours, followed another 1.5 hours later by the addition of 2.5 parts by volume of 30% by weight hydrogen peroxide and 0.5 part by volume of thioglycol as initiator. Polymerisation lasts for a total of 8 hours at 55° C., counting from the first addition of initiator.

After filtration under suction, washing and drying 750 parts by weight (76.5% of the theoretical) of a white polymer are obtained. K-value: 85; tert. N: 0.26 equ./kg., i.e. 4.06% by weight of basic monomer are incorporated in the polymer.

A 24% by weight solution of the polymer in dimethyl formamide was dry spun. Denier: 3.3 dtex, staple: 60 mm., colour: glossy.

The properties of the fibres are shown in Table I.

COMPARISON EXAMPLE

Copolymerisation of AN, AME, DMAN in nitric acid solution.

616 parts by weight of acrylonitrile, 70 parts by weight of β-dimethylaminoethyl methacrylate and 14 parts by weight of methyl acrylate are introduced into 7000 parts by volume of distilled water and the pH value adjusted to 2.8 with dilute nitric acid at 50° C. Polymerisation is initiated while stirring in a nitrogen atmosphere by the addition of 5 parts by weight of potassium persulphate and 2 parts by weight of sodium metabisulphite, being continued for 6.5 hours at a temperature of from 50 to 53° C. The polymer is then filtered off under suction and washed first with an aqueous $H_2SO_4$ solution having a pH value of 2.8 and then repeatedly with neutral water, after which it is dried in vacuo at 50 to 60° C. Yield: 563 parts by weight (80.5% of the theoretical); K-value: 89; tert. N=0.33 equ./kg.=5.04% by weight of a basic monomer incorporated in the polymer.

A 24% by weight solution of the copolymer in dimethyl formamide was dry spun. Denier: 3.3 dtex, staple: 60 mm., colour: glossy.

The properties of these fibres are set out in Table I.

TABLE I

[Fibre properties of the copolymers of Example 1 and the Comparison example. Their affinities for dyes are compared with those of a standard commercial type (modified by approximately 5% by weight of an alkyl vinyl pyridine, dry spun)]

| | Example 1 | Comparison example |
|---|---|---|
| Tack point | 220–225° C | 230–235° C. |
| Conductivity of the solution in DMF: | | |
| With exchanger | 1.27 µ S | 34 µ S. |
| Without exchanger | 25.5 µ S | 90 µ S. |
| Affinity for dyes: | | |
| Acid dyes (Extinction/g. of film): C.I. acid red 73, 27290 | 44.0 (530 mµ) | 58.5 (530 mµ). |
| Metal complex dyes: | | |
| C.I. acid black 138: | | |
| (a) Formic acid | Better than standard | Intensely dyed, standard=grey black. |
| (b) Acetic acid | do | Do. |
| C.I. acid blue 199: | | |
| (a) Formic acid | do | Deeper than standard. |
| (b) Acetic acid | do | Do. |
| Basic dyes: | | |
| C.I. basic red 18, 11085 | Better resist than standard | Better resist than standard. |
| Natural colour: 20° C | 0.143 | 0.255. |
| Thermal stability: | | |
| 1 hour at 90° C | 0.185 | 0.442. |
| 1 hour at 130° C° | 0.410 | 0.720. |
| Fastness to light (Xenotext) | The stages 6–7 are reached in every case (cf. 5–6) | |

EXAMPLE 2

872 parts by weight of AN, 49 parts by weight of AME and 59 parts by weight of DMAM are introduced into 7000 parts by volume of water, followed by the addition of dilute sulphuric acid at 55° C. up to a pH value of 6.5. The solution is stirred and a gentle stream of nitrogen is bubbled through it. Following the addition of 65 parts by volume of 30% by weight hydrogen peroxide 12 parts by volume of thioglycol and 3 parts by volume of a 0.01% by weight ferrous sulphate solution, polymerisation begins after an incubation period of approximately 15 minutes. The pH value is checked at short intervals and kept at 6.5 by the addition of small quantities of a sodium bicarbonate solution. After 5.5 hours, the polymer is worked up and dried in vacuo at 50 to 60° C.

Yield: 720 parts by weight (73.5% of the theoretical) K-value: 95; tert. N: 0.34 equ./kg.=5.3% of basic monomer. Dyeability (Azilandirektblau A, 578 mμ)

$$26.5 \frac{\text{extinction}}{\text{g. of film}}$$

EXAMPLE 3

436 parts by weight of acrylonitrile and 24.5 parts by weight of methyl acrylate are heated to 55° C. in 3000 parts by volume of water, followed by the addition of dilute hydrochloric acid up to pH 6.5. A gentle stream of nitrogen is bubbled through the solution which is stirred. 30 parts by volume of 30% by weight hydrogen peroxide, 8 parts by volume of thioglycol and 1.5 parts by volume of a 0.01% by weight solution of ferrous sulphate are added as initiator. Polymerisation begins after about 1 minute. 15 minutes after the beginning of polymerisation, a solution of 29.5 parts by weight of β-dimethylaminoethyl methacrylate in 400 ml. of water adjusted to pH 6.5 with hydrochloric acid is run in over a period of 40 minutes. The pH value is checked and kept at 6.4 to 6.5 by the addition of sodium bicarbonate and dilute hydrochloric acid. Polymerisation is continued for 7 hours at 55 to 56° C.

The yield of cleaned, dry polymer amounts to 450 parts by weight (92% of the theoretical). K-value 94; tert. N: 0.31 equ./kg.=4.8% of basic monomer in the copolymer. Dyeability (Azilandirektblau A, 578 mμ):

$$29 \frac{\text{extinction}}{\text{g. of film}}$$

EXAMPLE 4

7000 parts by volume of water are heated to 55° C., nitrogen is bubbled through and the pH value is adjusted to pH 3.8 with dilute sulphuric acid following the addition of 49 parts by weight of β-diisopropylaminoethyl methacrylate. 882 parts by weight of AN and 49 parts by weight of AME are added, and polymerisation is initiated with 16 parts by volume of 30% by weight hydrogen peroxide, 2.6 parts by volume of thioglycol and 1.5 parts by volume of 0.01% by weight ferrous sulphate solution. After 1.5 hours, another 8 parts by volume of hydrogen peroxide and 1.3 parts by volume of thioglycol are added as initiator, this addition being repeated another 1.5 hours later. Polymerisation is continued for 7 hours, after which the polymer is worked up. Yield: 785 parts by weight (80% of the theoretical); K-value: 83; tert. N: 0.16 equ./kg., i.e. 3.4% of basic monomer.

The polymer can be spun into fibres having an affinity for acidic dyes.

EXAMPLE 5

49 parts by weight of N-(3-dimethylaminopropyl)-methacrylamide are taken up in 7000 parts by volume of water and adjusted to pH 3.8 at 55° C. with dilute sulphuric acid. Polymerization is initiated following the addition of 49 parts by weight of methyl acrylate and 882 parts by weight of acrylonitrile by the addition to the stirred solution of 10 parts by volume of 30% by weight hydrogen peroxide, 2 parts by volume of thioglycol and 1.5 parts by volume of 0.01% by weight ferrous sulphate solution. 1.5 hours later, another 5 parts by volume of hydrogen peroxide and 1 part by volume of thioglycol are added. This addition of initiator is repeated again after another 1.5 hours.

The polymerization time is 8 hours at 55 to 56° C. 750 parts by weight (76.5% of the theoretical) of dried polymer are obtained. K-value: 98; tert. N: 0.18 equ./kg.=3.05% of basic monomer in the copolymer. Dyeability (Azilandirektblau A: 578 mμ):

$$23 \frac{\text{extinction}}{\text{g. of film}}$$

EXAMPLE 6

7500 ml. of distilled water and 525 g. of a mixture of 91% by weight of acrylonitrile, 5% by weight of methyl acrylate and 4% by weight of β-dimethylaminoethyl methacrylate are intimately mixed in an atmosphere of nitrogen in a 10 l. glass vessel which is equipped with a stirrer, a heating and cooling device and feed pipes which are in connection with storage vessels containing the single components necessary for the continuous polymerisation. The pH value of 2.8 is adjusted by the addition of sulphuric acid and the temperature is brought up to 55° C. Therefore, 200 g. of hydrogen peroxide solution (0.06% by weight), 200 g. of thioglycol solution (0.6% by weight) and 3 mg. iron in the form of FeSO$_4$ are added. After a period of four hours, there is formed a suspension of polymer material.

Thereafter, per hour, 180 ml. of the above-mentioned mixture of monomers, 54 ml. of the thioglycol solution, 54 ml. of the hydrogen peroxide solution, 96 ml. of sulphuric acid (2% by weight), 168 ml. of water and 120 ml. of an aqueous iron (II) sulphate solution (0.0001% by weight based on iron) are added.

The polymerisation is carried out continuously for several days at a temperature of 55° C. and at a pH-value of 2.8. The polymer suspension is led off from the upper part of the reaction vessel in the same measure as the reaction components are added. During the total reaction period, a gentle stream of nitrogen streams through the vessel. Yield of polymer material: 75% of the theoretical. K-value: 85; 4.46% by weight of β-dimethylaminoethyl methacrylate are incorporated in the polymer.

Based on the total amount of monomers, 0.225% by weight of thioglycol and 0.0225% by weight of hydrogen peroxide are used.

What is claimed is:

1. A process for the production of acrylonitrile copolymers which comprises polymerizing at least 60% by weight of acrylonitrile, from 0.5 to 20% by weight of a polymerizable compound containing an aliphatic or cycloaliphatic tertiary amine function selected from the group consisting of an N-dialkylaminoalkyl acrylamide, an N-dialkylaminoalkyl methacrylamide, an N-dialkylaminoalkyl itaconic acid amide, an N-dialkylaminoalkyl acrylate, an N-dialkylaminoalkyl methacrylate, an N-dialkylamino maleate, an N-dialkylamino fumarate, an N-dialkylaminoalkyl vinyl ether, an N-allyl amine, a C-allyl-amine and a C-vinylamine and 0 to 20% by weight of an additional polymerizable monomer selected from the group consisting of an acrylic ester, a methacrylic ester, a hydroxylalkyl acrylic ester, a hydroxyalkyl methacrylic ester, an acrylic amide, a methacrylic amide, vinyl acetate, 1,3-diacetoxy-2-methylene propane and styrene, in an aqueous acidic medium, at a temperature of from 20–90° C. and in the presence of a redox catalyst system consisting of 0.01–5% by weight of hydrogen peroxide and 0.1–5% by weight of thioglycol all percentages given being based on the total of monomers present.

2. A process as claimed in claim 1 wherein said additional polymerizable monomer is methyl acrylate.

3. A process as claimed in claim 1 wherein polymerization is carried out at a pH of from 2 to 7.5.

4. A process as claimed in claim 1 wherein the pH is from 5.5 to 7.0.

5. A process as claimed in claim 1 wherein the temperature is from 50 to 60° C.

6. A process as claimed in claim 1 wherein polymerization is carried out in the presence of from 0.0005 to 0.001% by weight, of iron ions in the form of an iron salt.

7. A process as claimed in claim 1 wherein the additional polymerization monomer is a vinyl acetate.

8. A process as claimed in claim 1 wherein the additional polymerizable monomer is a styrene.

9. A process as claimed in claim 1 wherein the additional polymerizable monomer is an acrylic ester.

10. A process as claimed in claim 1 wherein the additional polymerizable monomer is a methacrylate ester.

References Cited
UNITED STATES PATENTS

| | | | |
|---|---|---|---|
| 2,138,762 | 11/1938 | Harmon | 260—2 |
| 2,436,926 | 3/1948 | Jacobson | 260—34 |
| 2,599,300 | 6/1952 | Upson | 260—94.9 |
| 2,621,170 | 12/1952 | Banes et al. | 260—79.5 |
| 2,649,438 | 8/1953 | Bruson | 260—85.5 |
| 3,065,211 | 11/1962 | Milford et al. | 260—85.5 |
| 3,253,058 | 5/1966 | Isley et al. | 260—881 |

JOSEPH L. SCHOFER, Primary Examiner

S. M. LEVIN, Assistant Examiner

U.S. Cl. X.R.

260—32.6 N, 78.5 B, 78.5 R, 85.5 AM

UNITED STATES PATENT OFFICE
CERTIFICATE OF CORRECTION

Patent No. 3,767,631    Dated October 23, 1973

Inventor(s) Helmut Engelhard, et al

It is certified that error appears in the above-identified patent and that said Letters Patent are hereby corrected as shown below:

Column 6, Table 1, 1st column, next to last line, delete the degree "0" mark after the letter "C"

Column 9, Claim 10, line 2, "methacrylate" should read ---methacrylic ---.

Signed and sealed this 7th day of January 1975.

(SEAL)
Attest:

McCOY M. GIBSON JR.　　　　　　　C. MARSHALL DANN
Attesting Officer　　　　　　　　Commissioner of Patents